United States Patent Office 2,877,998
Patented Mar. 17, 1959

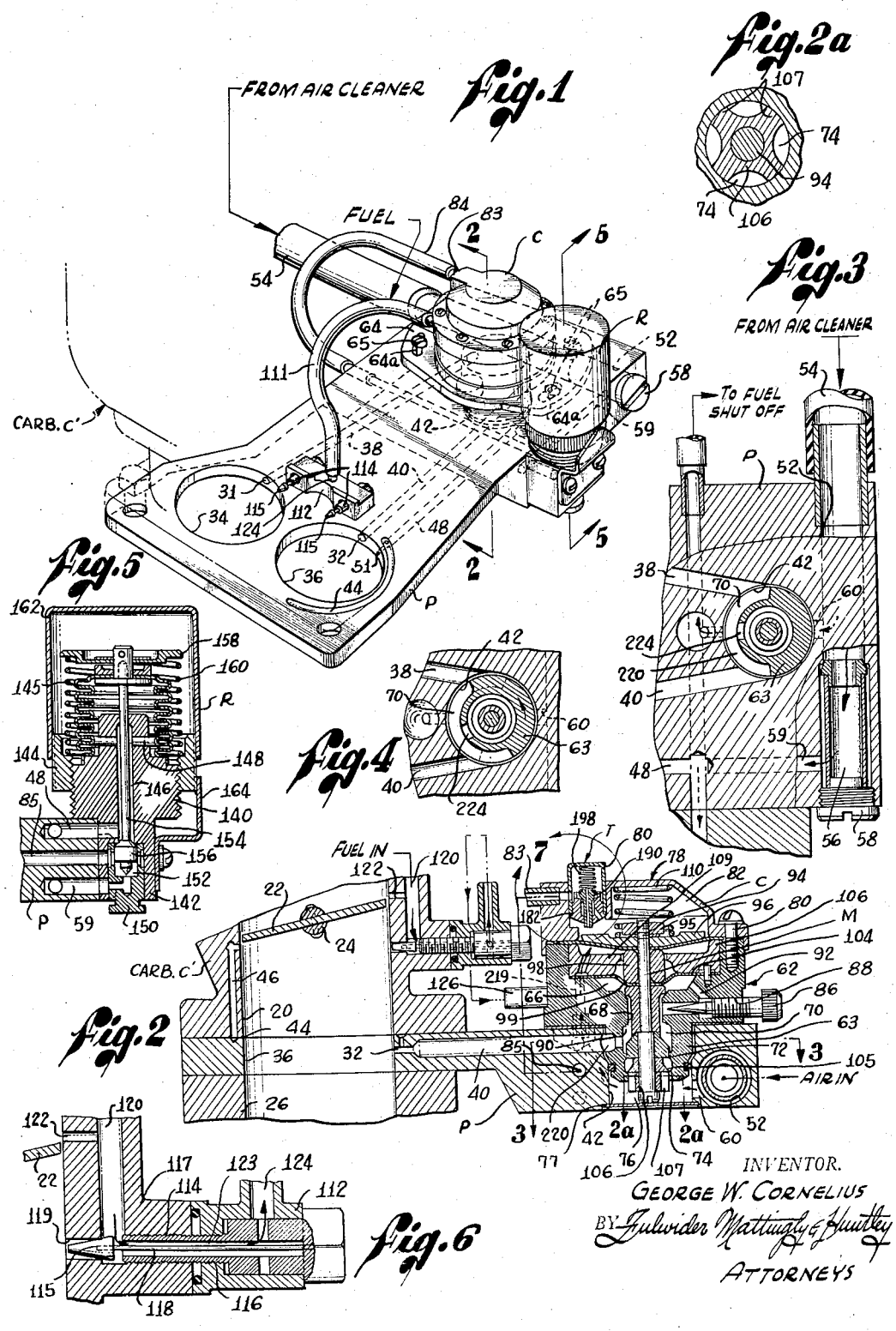

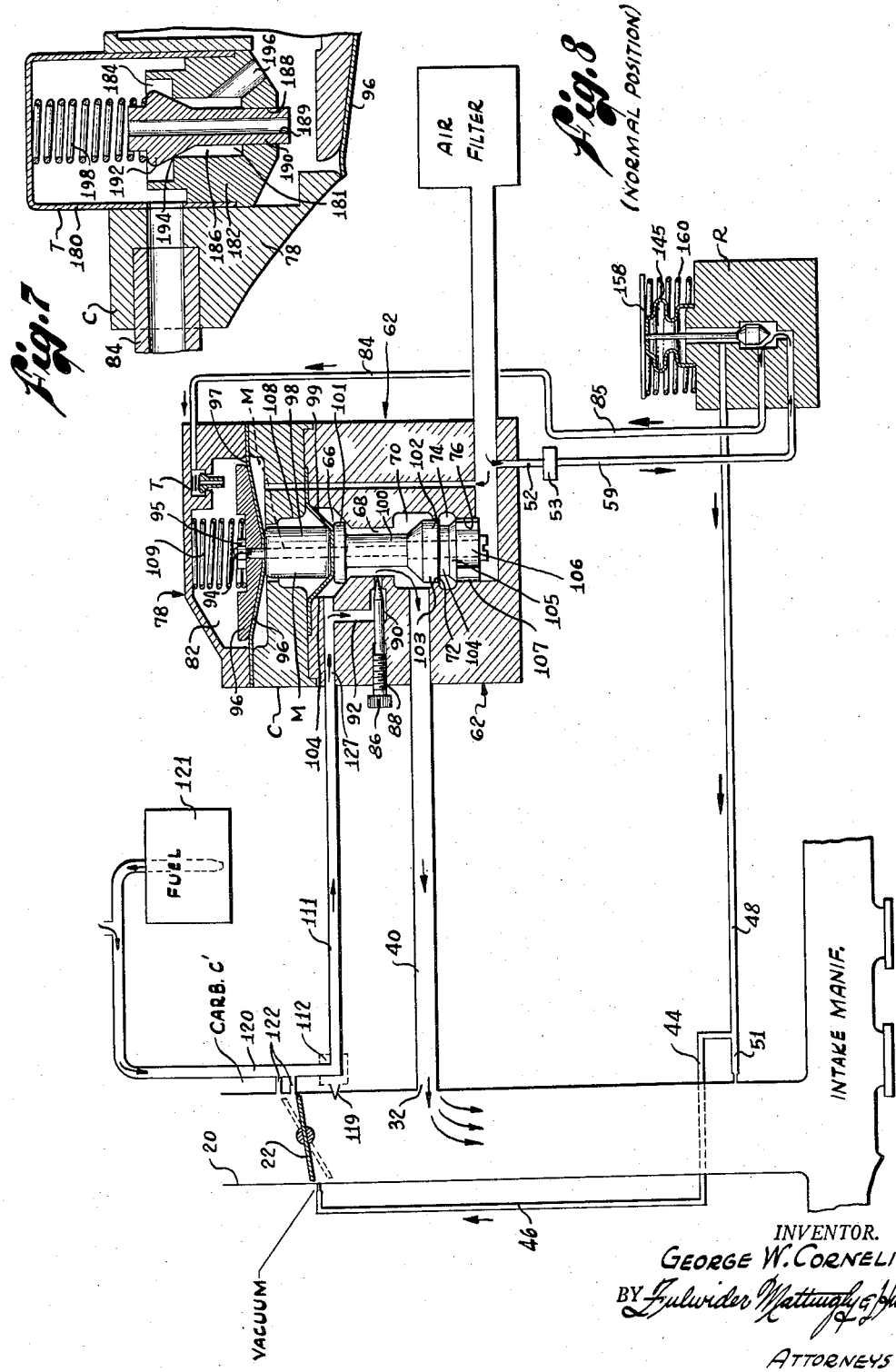

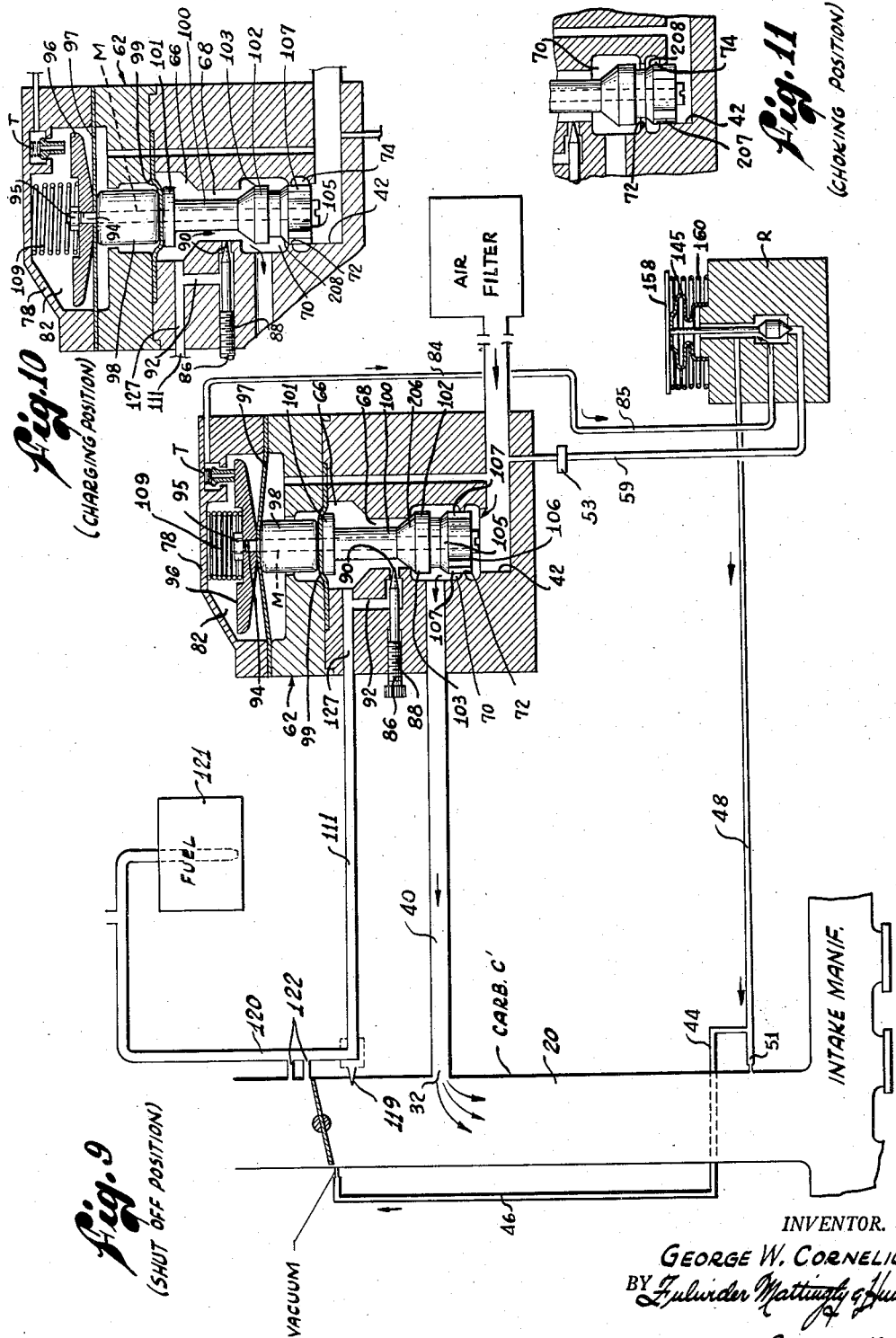

2,877,998

APPARATUS FOR CONTROLLING THE ADMISSION OF FUEL AND AIR TO AN INTERNAL COMBUSTION ENGINE

George W. Cornelius, Portuguese Bend, Calif., assignor to Holley Carburetor Company, Van Dyke, Mich.

Application June 29, 1956, Serial No. 594,841

15 Claims. (Cl. 261—41)

The present invention relates generally to internal combustion engines and more particularly to an apparatus to control the admission of fuel thereto so as to reduce the volume of contaminants released thereby.

It is well known that the unburned contaminants exhausted from internal combustion engines of automotive vehicles constitute a prime source of the so-called "smog" which exists in and around the principal population centers of the country. The harmful effect of this smog upon animate and inanimate objects are likewise very well known. Since the inception of smog and the recognition of its detrimental effect upon health and plant life, extensive research has been conducted in order to determine how the internal combustion engine's contribution to smog could be successfully diminished. Considerable attention has been devoted to the deceleration cycle during which time the largest percentage of unburned products of combustion are exhausted from the engine. This large percentage results from the fact that during deceleration the fuel entering the engine's combustion chambers does not undergo complete burning. Accordingly, unburned hydrocarbons are exhausted into the atmosphere where they contribute substantially to the smog content thereof. Additionally, these unburned hydrocarbon products form carbon deposits within the combustion chambers, exhaust valve ports and the remainder of the exhaust system. These disadvantages are in addition to the reduction in mileage resulting from the considerable loss of fuel from the carburetor during deceleration, such fuel being drawn from the idling system of the carburetor because of the extreme vacuum created in the intake manifold during deceleration.

For the foregoing reasons it has been heretofore-proposed to provide automatic shut-off devices for positively stopping the flow of fuel to an engine undergoing deceleration. With most of the heretofore-proposed fuel shut-off devices a decided "flat spot" or momentary lack of power is experienced when the accelerator is opened after a period of deceleration. This inability to effect a smooth recovery is generally caused by the time lag required to change the fuel in the idling system from a static condition to a moving condition. These heretofore-proposed fuel shut-off devices likewise generally fail to provide the engine with sufficient fuel to adequately re-wet the dried-out intake manifold after a period of deceleration, which failure is also partially responsible for the aforementioned "flat spot."

It is a major object of the present invention to provide an improved apparatus for controlling the admission of fuel and air to an internal combustion engine during and immediately after a period of deceleration.

Another object is to provide control apparatus of the aforedescribed nature which is simple in design and rugged of construction whereby it may afford a long and trouble-free service life.

A further object is to provide control apparatus of the aforedescribed nature which is foolproof and efficient in operation under all conditions.

Yet another object is to provide control apparatus of the aforedescribed nature which may be readily installed upon the engine of existing automotive vehicles or alternatively may be incorporated into original equipment.

Another object of the invention is to provide control apparatus of the aforedescribed nature which requires a minimum of maintenance once it has been installed.

An additional object of the present invention is to provide control apparatus which is especially adapted for use with multi-barrel carburetors now employed extensively on modern automotive vehicles, said apparatus incorporating unique means for obtaining an equal distribution of fuel and air to the various barrels of the carburetor.

Another object is to provide control apparatus which may be manufactured at a comparatively low cost whereby it may find a wide market.

Yet an additional object of the invention is to provide control apparatus which is entirely automatic in operation and which is compact and light in weight.

These and other objects and advantages of the present invention will become apparent from the following detailed description, when taken in conjunction with the appended drawings, wherein:

Figure 1 is a general perspective view of a preferred form of control apparatus embodying the present invention and especially adapted to carry out the method thereof;

Figure 2 is an enlarged vertical sectional view taken on line 2—2 of Figure 1;

Figure 2a is an enlarged horizontal sectional view taken on line 2a—2a of Figure 2;

Figure 3 is a horizontal sectional view taken on line 3—3 of Figure 2;

Figure 4 is a fragmentary view of a portion of Figure 3 showing certain parts therein disposed in a different position;

Figure 5 is an enlarged vertical sectional view taken along line 5—5 of Figure 1 and showing a regulator employed with said apparatus;

Figure 6 is an enlarged vertical sectional view of a fuel bridge employed with said apparatus;

Figure 7 is an enlarged view of the encircled area designated 7 in Figure 2; and Figures 8 through 11 are diagrammatic views showing the mode of operation of the method and apparatus of the present invention.

GENERAL ARRANGEMENT

Referring to the drawings, the preferred form of control apparatus which may be employed to carry out the method of the present invention is adapted for use with a fuel supplying device, such as a conventional carburetor C, which in the embodiment disclosed herein is of the two-barrel type. The two barrels or throats 20 of the carburetor C (only one of which is shown in the drawings) are identical and referring to Figure 2, a butterfly type throttle valve 22 is disposed in each of these barrels. Each of the throttle valves 20 are keyed to a common horizontal shaft 24 extending between the walls of the carburetor so as to support the throttle valves for pivotal movement relative thereto. The shaft 24 protrudes through the carburetor walls so as to receive the accelerator pedal linkage (not shown) of the automotive vehicle. With this arrangement and referring to Figures 2, 8 and 9, depression of the accelerator pedal will effect counter-clockwise rotation of the throttle valves 22 from their closed or idling position shown in solid outline in these figures towards an open position shown in dotted outline in Figure 8. The throttle valves 22 are normally biased towards their closed or idling position by suitable spring means (not shown).

It should be particularly noted that although the preferred form of control apparatus disclosed herein is especially adapted for use with existing carburetor equipment, it likewise readily lends itself to use with original carburation equipment and when so utilized its outside configuration and number of parts will be different from that of the disclosed embodiment. The preferred form of fuel control apparatus includes a flat adaptor plate P adapted to be sandwiched between the lower end of the carburetor C and the upper end of a fitting 26 leading to the engine's intake manifold, an air-fuel control member C mounted at one side of the adaptor plate P and a regulator member R mounted on the adaptor plate adjacent the air-fuel control member. The air-fuel control member C is adapted to effect a positive stoppage of the fuel entering each of the carburetor throats 20 through its idling ducts 31 and 32 during deceleration of the engine. At the same time, air is admitted to the intake manifold through these idling ducts. The sensing means for effecting operation of the air-fuel control member C is the regulator valve R. The motivating force for operating both the regulator valve R and the air-fuel control member C is the intake manifold pressure of the engine. The air-fuel control member C incorporates integral means for positively controlling the air-fuel ratio of the fuel mixture after a period of deceleration, as will be fully set forth hereinafter.

The adaptor plate P

With particular reference to Figures 1 and 2, the adaptor plate P is of generally flat configuration. It is formed at one side with a pair of circular apertures 34 and 36 which are vertically aligned with the two barrels 20 of the carburetor C when the adaptor plate is sandwiched between the underside thereof and the intake manifold fitting 26. The aforementioned idling ducts 31 and 32 are both formed in the adaptor plate P and have their rear portions in communication with a pair of horizontal passages 38 and 40 formed through the adaptor plate and extending to a socket 42 formed in the side thereof opposite the circular apertures 34 and 36. This socket 42 receives the air-fuel control member C. A semi-circular conduit 44 encompasses a portion of one of the circular apertures 36. The front end of this conduit 44 is in communication with a vertical conduit 46 formed in the carburetor C, as shown in Figure 2. The upper end of this vertical conduit 46 terminates in the carburetor throat 20 below one side of the throttle valve 22. The opposite end of this semi-circular conduit 44 is in communication with a horizontal conduit 48 formed through the adaptor plate P and communicating at its opposite end with the regulator R. The front end of the horizontal conduit 48 is in communication with the plate aperture 36 by a short conduit 51.

The side of the adaptor plate P remote from the circular apertures 34 and 36 is formed with a horizontal bore 52. As shown particularly in Figures 1, 2 and 3, one side of this bore 52 is in communication with an air cleaner (not shown) by a length of tubing 54. A filter element 56 is secured within the opposite end of this bore by a threaded plug 58. The portion of the horizontal bore 52 adjacent the filter element 56 is in communication with a conduit 59 extending to the regulator member R. The mid-portion of the horizontal bore 52 is in communication with the lower portion of the air-fuel control member-receiving socket 42 by means of another conduit 60, as shown in Figure 2.

The air-fuel control member C

Referring now to Figures 1 and 2, the air-fuel control member C includes a generally cup-shaped body 62 having a depending boss 63 slidably received by the socket 42 of the adaptor plate P. The lower end of the body 62 is formed with a mounting flange 64 that is secured to the adaptor plate P by bolts 65 extending through arcuate slots 64ª formed in the mounting flange 64. The cavity 66 of this body 62 merges at its lower end into a coaxial vertical fuel passage 68. The lower end of this fuel pass passage 68 merges into an enlarged distribution chamber 70. The lower end of this distribution chamber 70 is defined by an inturned annular choke restrictor lip 72. Below this lip 72 an air by-pass chamber 74 is formed. The latter merges into a bore 76 which extends to the lower end of the body 62 where it is closed by a flat plate 77.

A generally cylindrical cap 78 is rigidly secured to the upper portion of the body 62 by a plurality of cap screws 80. The interior of the cap 78 defines a sealed chamber 82 having communication with the intake manifold pressure of the engine by means of a length of tubing 83, a conduit 84 formed in the adaptor plate P and the regulator R, in a manner to be described hereinafter. A timer T is positioned within the cap 78 for a purpose that is likewise to be fully described hereinafter. An idle adjusting screw 86 is carried by one side of the body 62 within a threaded bore 88. The front end of this bore 88 terminates in a discharge port 90 having its radially inner end intersecting the vertical fuel by-pass passage 68. An inlet port 92 interconnects the front end of the bore 88 with the cavity 66.

A vertically reciprocable fluid control post M is disposed within the by-pass passage 68. This fluid control post M includes a bolt 94, the upper portion of which carries a nut 95. A rigid disk 96 is disposed below the nut 95 and a flexible actuating diaphragm 97 is arranged therebelow. A tubular bearing 98 is interposed between the actuating diaphragm 97 and a fuel sealing diaphragm 99. Below the latter, the fluid control post M carries a blocking plug 100 having an annular head 101. The lower end of this blocking plug 100 abuts a fuel shut-off plug 102, the upper portion of which is of downwardly tapering frustro-conical configuration. Preferably, this fuel shut-off plug 102 is formed of a synthetic plastic, such as Teflon. The land 103 of the fuel shut-off plug 102 is cylindrical and has a sealing slidable fit with respect to the choke restrictor lip 72 of the air-fuel control member C. An air by-pass plug 104 having a downwardly tapering frustro-conical lower end portion 105 is disposed below the fuel shut-off plug 102. A bearing 106 having vertically extending flutes 107 is carried by the lower end of the bolt 94. The actuating diaphragm 97 is supported flush with the upper edge of the body 62 by the cap 78. A coiled compression spring 109 is interposed between the upper surface of the disk 96 and the underside of the cap 78. The periphery of the fuel sealing diaphragm 99 is mounted within the intermediate portion of the cavity 66 by a retainer 110.

Fueling arrangement

Liquid fuel from the carburetor C is adapted to reach the air-fuel control member's cavity 66 and thus the fuel by-pass passage 68 by means of a length of flexible tubing 111. The opposite end of this flexible tubing 111 is connected to a fuel bridge 112 shown particularly in Figures 1, 2 and 6. The fuel bridge 112 supports a pair of plugs 114 each having a generally frustro-conical front end 115 secured to the main body 116 of the plug by a length of wire 118. These frustro-conical closure elements 115 are inserted within the original idling discharge holes 119 of the carburetor C so as to block the flow of fuel therethrough when the main bodies 116 are threaded into a base 117 formed on the carburetor C. Referring now to Figures 2 and 6, the fuel normally enters the original idling discharge holes 119 through a vertical idle tube passage 120 formed along each carburetor throat 20 and having its upper end in communication with a fuel reservoir 121 formed in the carburetor C. A pair of transfer holes 122 provide communication between the lower portion of each of the idle tube passages 120 and the atmosphere within the carburetor throats 20 at a point spaced just above the edge of the throttle valve 22 when the latter is disposed in a closed or idling position. When the frustro-conical closure elements 115 are positioned within the original idle discharge holes 119, fuel and air from this passage 120 is by-passed through a longitudinal bore 123 formed in each of the plugs 114 and thence into a nipple 124 formed on the fuel bridge 112 and connected to the tubing 111. The tubing 111 is secured to a nipple 126 secured to one side of the air-fuel control member's body 62 and connected to the lower portion of the cavity 66 by a passage 127. The emulsion of fuel and air after entering the cavity 66 is adapted to flow downwardly into the pair of horizontal passages 38 and 40 formed in the adaptor plate P, the opposite end of these passages terminating in the idling ducts 31 and 32.

The regulator R

Referring now particularly to Figures 1 and 5, the regulator R includes a base 140 having a mounting block 142 depending from its lower end and affixed to the adaptor plate P. The main portion of the base is cylindrical and is externally threaded so as to receive an adjustment nut 144. The base 140 is formed with a vertically extending passage 146 which extends through its upper end. A plurality of radially extending conduits 148 are formed in the upper portion of the base 140 and intersect the vertical passage 146. The mounting block 142 of the base 140 is recessed so as to receive a valve housing 150. This valve housing 150 is formed with a cavity 152 having its lower end in communication with the conduit 59 having communication with the adaptor plate bore 52. The upper portion thereof is in communication with the sealed chamber 82 of the air-fuel control member C by means of the adaptor plate conduit 85 and the tubing 84. The lower portion of the vertically extending passage 146 is in communication with the horizontally extending conduit 48 formed in the adaptor plate P. A vertically reciprocal valve stem 154 is disposed within the vertical passage 146. The lower end of this valve stem 154 is formed with a valve element 156 slidably disposed within the cavity 152. The upper end of the valve stem 154 is secured to a spring retainer 158. A coiled compression spring 160 is interposed between the underside of this retainer 158 and the adjustment nut 144. A flexible metallic bellows 145 is encompassed by this spring 160 and extends between the upper portion of the base 140 and the upper portion of the valve stem 146. A cup-shaped housing 162 extends upwardly from the adjustment nut 144 so as to protect the aforedescribed parts. Preferably, the peripheral surface of the adjustment nut 144 will be knurled. A flexible keeper 164 having its lower end affixed to the mounting block 142 is provided for resiliently resisting rotation of the adjustment nut 144.

The timer T

Referring particularly to Figures 2 and 7, the timer T includes a generally cylindrical case 180 which is supported by the cap 78 of the air-fuel control member C. The interior of the case 180 is in communication with the conduit 84. A seat member 182 is formed within the lower portion of the case 180. This seat member 182 is formed with a vertically extending passage 181 having an enlarged upper portion 184, an intermediate portion 186 of smaller diameter and a lower portion 188 of least diameter. A stop element 190 is slidably disposed within the passage 181, the major length of this element having a diameter slightly smaller than the lower passage portion 188. The upper end of the stop element 190 is formed with a frustro-conical enlargement 192 adapted to seat on the shoulder 194 defined between the two passage portions 184 and 186. The stop element 190 is centrally formed with an axially extending orifice 189.

A by-pass port 196 connects the interior of the sealed pressure chamber 82 with the intermediate passage portion 186. A coiled compression spring 198 is interposed between the upper end of the stop element 190 and the upper wall of the case 180 so as to constantly bias the stop element downwardly.

Operation

In the operation of the aforedescribed fuel control apparatus, during idling and cruising conditions, the parts of the apparatus will be disposed in their normal position shown in Figures 2, 5 and 8. With particular reference to these figures, it will be observed that the valve element 156 of the regulator R is disposed in its raised position, inasmuch as the intake manifold vacuum existing within the carburetor throat 20 and transmitted to the interior of the metallic bellows 145 by the conduits 48 and 51 is not of sufficient magnitude to overcome the force of the compression spring 160. Accordingly, the valve cavity 152 of the regulator will be placed in communication with the atmosphere by means of conduits 59, 52 and 54. This atmospheric pressure will be likewise transferred to the interior of the airfuel control member's sealed chamber 82 by the conduit 85, the flexible tubing 84 and the timer T. Hence, the control member's spring 110 will urge the fluid control post M downwardly to its lowermost position. With the post M disposed in this position, the head 101 of the blocking plug 100 will be seated against the upper end of the fuel by-pass passage 68 so as to prevent downward flow of fuel and air therethrough. Therefore, only fuel and air in an amount sufficient for normal idling will be permitted to flow through the inlet and discharge ports 92 and 90, respectively. The exact ratio of the fuel and air flowing through these two ports may be controlled by the idle adjustment screw 86. From the discharge port 90 this mixture of fuel and air will flow through the adaptor plate's horizontal passages 38 and 40 to the idling ducts 31 and 32. It should be observed that during this time the land 103 of the fuel shut-off plug 102 cooperates with the choke restrictor lip 72 to prevent the upward passage of air from the socket 42 into the distribution chamber 70 of the air-fuel control member C.

Referring now to Figure 9, upon deceleration the magnitude of intake manifold vacuum will increase to a maximum. This negative pressure will be communicated to the interior of the regulator's bellows 145 by means of the conduits 48 and 51 as indicated by the directional arrows in this figure. The magnitude of the intake manifold vacuum is sufficient to overcome the force of the regulator's spring 160 and accordingly the valve stem 154 and hence its valve element 156 snaps downwardly. In this position the valve element 156 will block communication between the atmosphere and the regulator's cavity 152. It will additionally uncover the conduit 85 so as to place the upper portion of the cavity 152 and hence the conduit 85 in communication with the intake manifold vacuum. The intake manifold vacuum will thereby be transmitted to the chamber 82 of the air-fuel control member C by the conduits 84 and 85 and the timer T. It should be observed that this chamber 82 is not placed in communication with the intake manifold vacuum until the latter has reached its maximum magnitude. The magnitude of this vacuum is then sufficient to overcome the force of the spring 109 and accordingly the actuating bellows 96 will cause the fluid control post M to be snapped upwardly. Upon this occurrence the frustro-conical portion 206 of the fuel shut-off plug 102 will engage the lower periphery of the fuel passage 68 so as to positively shut off all flow of fuel therethrough. Concurrently, the air by-pass plug 104 will have been raised sufficiently so as to uncover the lower end of the distribution chamber 70. Accordingly, air will be drawn into the distribution chamber from the air cleaner through the adaptor plate's horizontal bore 52, conduit 60, the socket 42 and the flutes 107 of the lower bearing 106.

Referring now to Figure 10, after a period of deceleration the magnitude of the intake manifold vacuum will return to a lower value. At such time as the magnitude of this negative pressure falls below that required to maintain the regulator's spring 160 compressed, the regulator's valve stem 154 will be moved upwardly into its original position of Figures 5 and 8. This will serve to again connect the interior of the sealed chamber 82 of the air-fuel control member C with the atmosphere. It will be particularly observed that as this atmospheric pressure is admitted to the interior of the timer case 180, the stop element's enlargement 192 will be disposed in a raised position off its seat 194, having been lifted into such position by the disk 96 as the fluid control post M moved upwardly to a fuel shut-off position. Thus, air at atmospheric pressure will be free to enter the sealed chamber 82 through the passage portion 186 without appreciable restriction. Accordingly, the control member's spring 109 will be free to snap the fuel control post M downwardly. This downward motion will take place with a snapping action until the stop element's enlargement 192 seats upon the shoulder 194, as indicated in Figure 10. Upon such occurrence, communication between the sealed chamber 82 and the atmosphere must take place solely through the greatly restricted area of the stop element's orifice 189. Accordingly, thereafter the fluid control post M will descend at a much lower rate of speed. At the conclusion of this post's initial snapping descent, the head 101 of the blocking plug 100 will be disposed above the upper end of the fuel passage 68 while the land 103 of the fuel shut-off plug 102 will be in sealing engagement with the choke restrictor lip 72 so as to seal off the atmosphere from the lower portion of the distribution chamber 70. When substantially all of the air entering the intake manifold through the lower end of the control member C is thus cut off, a heavy charge of fuel emulsion will be drawn from the carburetor C through the upper end of the fuel passage 68 into the distribution chamber 70, and thence into the intake manifold so as to immediately bring the previously static fuel disposed in the idling fuel passages into motion.

Referring now to Figure 11, as noted above once the stop element's enlargement 192 is seated upon the shoulder 194, the atmospheric air can enter the air-fuel control member's sealed chamber 82 solely by means of the stop element's orifice 189, and accordingly the rate of descent of the fluid control post M will be comparatively slow. As the lower end 105 of the air by-pass plug 104 descends below the choke restrictor lip 72, atmospheric air will again be admitted to the distribution chamber 70 from the socket 42. Although the volume of such air will be restricted because of the relationship between the air by-pass plug's lower end 105 and the air by-pass chamber 74, it will be in excess of that required for normal idling. This excess air will be admitted until the post M again reaches its lowermost position, at which time the land 103 of the fuel shut-off plug 102 will again block off the flow of air through the socket 42. Concurrently with this admission of air in excess of that required for idling, an amount of fuel in excess of that required for idling will likewise be admitted to the distribution chamber 70, inasmuch as the head 101 of the blocking plug 100 will remain above the upper end of the fuel passage 68 until fluid control post M again reaches its lowermost position. This excess fuel passes directly from the passage 127 and the lower portion of the socket 66 into the upper end of the fuel passage 68.

With the above-described arrangement, after deceleration, the fuel and air in the idling passages will be brought from a static to a flowing condition when the fuel shut-off's land 103 momentarily blocks off the atmosphere from the distribution chamber 70. Thereafter, as the fluid control post M completes its downward movement an amount of fuel and air in excess of that required for normal idling is admitted to the distribution chamber. Moreover, the air/fuel ratio of this excess air and fuel will be accurately controlled because of the cooperative relationship between the lower end 105 of the air by-pass plug 104 and the air by-pass chamber 74. Accordingly, if after deceleration the engine is again accelerated, the engine may undergo a smooth recovery without a "flat spot." If instead of again accelerating, the engine is permitted to idle, the introduction of fuel and air in excess of that required for normal idling will cause the engine to undergo a simulated open throttle condition whereby it will tend to momentarily increase its speed. The air entering the intake manifold will then be enabled to carry the fuel mixture throughout the intake manifold so as to re-wet this manifold with fuel. In this manner the engine may return to normal idling without faltering or stopping without any appreciable time lag.

It should be particularly observed that the aforedescribed apparatus includes means for preventing inadvertent actuation of the air-fuel control member C except during deceleration. In this regard it is sometimes possible to raise the intake manifold vacuum of an engine to a magnitude approaching deceleration vacuum by gradually opening the throttle valve without load. This same result may likewise be accomplished where the automotive vehicle is travelling at high speed and the throttle is suddenly closed to a light cruising position. To prevent such an occurrence there are provided the conduits 44 and 46 which place the conduit 48 and hence the regulator bellows 145 in communication with a point in the carburetor throat 20 located just below one side of the throttle valve 22. This point is substantially uncovered by the throttle valve when the latter is moved to a slightly opened position. Accordingly, whenever the throttle valve is opened past its idling position the regulator bellows 145 will be placed in communication with air existing at substantially atmospheric pressure. In this manner, inadvertent movement of the fluid control post M to a fuel shut-off position cannot take place.

Preferably, the portion of the air-fuel control member's sealed chamber 82 below the actuating diaphragm 96 will be connected to the atmosphere, as by a conduit 219 formed through the body 62 and terminating in the socket 42. With this arrangement, the underside of the actuating diaphragm 96 and the upper surface of the fuel sealing diaphragm 104 will always be exposed to the same pressure.

*Adjustment of fuel to the two carburetor throats*

It is essential to smooth idling that a substantially equal amount of fuel be delivered by both of the carburetor throats 20. It often occurs, however, that due either to manufacturing tolerances or the like, one carburetor throat will deliver more fuel than the other. The engine will then idle roughly. To overcome this difficulty, conventional carburetors are generally provided with a separate idle adjustment screw for each bank. It is both time-consuming and difficult to so manipulate these two idle adjustment screws that smooth idling can be accomplished.

The apparatus of the present invention is provided with only the single idle adjustment screw 86. It is additionally provided, however, with unique means for effecting an equal flow of fuel to both carburetor throats 20, utilizing this single idle adjustment screw 86 for obtaining the proper idling mixture.

Referring now to Figures 3 and 4, it will be observed that the air-fuel control member's boss 63 is formed with an arcuate recess 220 which is connected to the distribution chamber 70 by a short bore 222. This recess 220 transfers the fuel flowing from the distribution chamber to the adaptor plate's horizontal passages 38 and 40. With the air-fuel control member C disposed in its position of Figure 3, substantially the same amount of area of the recess 220 faces the passage 38 as faces passage 40. Hence, substantially the same volume of fuel will flow through each of these passages into the two carburetor throats. When, however, the air-fuel control member C is rotated within the adaptor plate's socket 42 to its position of Figure 4 by loosening the screws 64, the volume of fuel flowing to the passage 38 will be reduced as compared to that flowing to the passage 40. In this manner the flow of fuel to the carburetor throat 20 aligned with the adaptor plate's circular aperture 34 will be reduced.

Various modifications and changes may be made with respect to the foregoing description without departing from the spirit of the invention or the scope of the following claims.

I claim:

1. Apparatus for controlling the admission of fuel and air to an internal combustion engine having a fuel supplying device, an intake manifold and idling fuel passage means interconnecting said fuel supplying device and said intake manifold, comprising: an air-fuel control member having a body formed with a distribution chamber, said chamber being in communication with said passage means and with the atmosphere; a fluid control member disposed in said distribution chamber and movable between a deceleration position wherein it blocks all flow of fuel therethrough while admitting atmosphere thereinto, a charging position wherein it admits fuel and air to said distribution chamber in excess of that required for normal idling while blocking communication between said chamber and the atmosphere and a normal position wherein it admits sufficient fuel and air to flow through said chamber to support normal idling; and actuating means operatively connected to said fluid control member so as to automatically urge it between said positions responsive to the throttle setting and rotational speed of said engine, said actuating means including a pressure-responsive wall attached to said fluid control member and having one of its sides exposed to a source of substantially constant pressure with its opposite side disposed in a sealed chamber, and regulator means for effecting communication between said sealed chamber and said source or alternately between said sealed chamber and the intake manifold pressure of said engine.

2. Apparatus as set forth in claim 1 wherein said regulator means includes a valve movable within a valve chamber so as to connect said sealed chamber with either said source of substantially constant pressure or with the intake manifold pressure of said engine, and a pressure-responsive member operatively connected to said valve and having one of its sides exposed to said source and the other to said intake manifold pressure whereby said sealed chamber will not be connected to said intake manifold pressure until the latter reaches a predetermined value.

3. Apparatus for controlling the admission of fuel and air to an internal combustion engine having a carburetor, an intake manifold and idling fuel passage means interconnecting said carburetor and said intake manifold, comprising: an air-fuel control member formed with a fuel passage communicating with said passage means and with a distribution chamber intersecting said fuel passage and having communication with the atmosphere, said member also being formed with fuel-air by-pass means which can conduct sufficient fuel and air to support normal idling of said engine; plug means carried by said air-fuel control member including a blocking plug that cooperates with said fuel passage to block flow therethrough during normal operation of said engine except through said fuel-air by-pass means, said plug means also including a shut-off plug that cooperates with said fuel passage to block substantially all flow of fuel therethrough during deceleration of said engine while connecting said distribution chamber to the atmosphere, said plug means being movable after deceleration to a position wherein said blocking plug cooperates with said fuel passage to momentarily admit fuel and air into said distribution chamber in excess of that required for normal idling while said shut-off plug concurrently prevents communication between said distribution chamber and the atmosphere except through said fuel passage so as to convert the fuel and air in said passage means from a static to a flowing condition; and actuating means operatively connected to said plug means to effect its movement responsive to the throttle setting and rotational speed of said engine.

4. Apparatus as set forth in claim 3 wherein said actuating means includes a pressure-responsive wall attached to said plug means and having one of its sides exposed to the atmosphere and its opposite side disposed in a sealed chamber, and regulator means for alternately effecting communication between said sealed chamber and the atmosphere or between said sealed chamber and the intake manifold pressure of said engine.

5. Apparatus as set forth in claim 4 wherein said regulator means includes a valve movable within a valve chamber so as to connect said sealed chamber with either the atmosphere or with the intake manifold pressure of said engine, and a pressure-responsive member operatively connected to said valve and having one of its sides exposed to the atmosphere and its other side exposed to said intake manifold pressure whereby said sealed chamber will not be connected to said intake manifold pressure until the latter reaches a predetermined value.

6. Apparatus for controlling the admission of fuel and air to an internal combustion engine having a carburetor, an intake manifold and idling fuel passage means interconnecting said carburetor and said intake manifold, comprising: an air-fuel control member having a body formed with a fuel passage intersecting said passage means and in communication with said carburetor, said control member being formed with a distribution chamber, one side of which intersects said fuel passage and the other side of which intersects said passage means and is in communication with said intake manifold, said control member also being formed with fuel-air by-pass means which can conduct sufficient fuel and air to support normal idling of said engine, said control member likewise being formed with an air by-pass chamber, one side of the latter being separated from said distribution chamber by a choke restrictor lip and another side of the latter merging into an opening having communication with the atmosphere; a fluid control member disposed within the body of said air-fuel control member and having a blocking plug, a fuel shut-off plug and an air by-pass plug; and actuating means operatively connected to said fluid control member so as to move it between a normal position wherein said blocking plug cooperates with said fuel passage to block flow therethrough during normal operation of said engine except through said fuel air by-pass means, a shut-off position wherein said fuel shut-off plug cooperates with said fuel passage to block all fluid flow therethrough while permitting communication between said distribution chamber and the atmosphere by means of said opening, a charging position wherein said blocking plug cooperates with said fuel passage to momentarily admit fuel and air into said distribution chamber in excess of that required for normal idling while a portion of said shut-off plug concurrently engages said choke restrictor lip so as to cut off flow between said distribution chamber and said opening, and an excess fuel-air position wherein said air by-pass plug cooperates with said air by-pass chamber to admit air into said distribution chamber in excess of that required for normal idling while said blocking plug cooperates with said fuel passage to admit fuel into said distribution chamber in excess of that required for normal idling.

7. Apparatus as set forth in claim 6 wherein said actuating means includes a pressure responsive wall attached to said fluid control member and having one of its sides exposed to the atmosphere and its opposite side disposed in a sealed chamber, and regulator means for alternately effecting communication between said sealed chamber and the atmosphere or between said sealed chamber and the intake manifold pressure of said engine.

8. Apparatus as set forth in claim 7 wherein said regulator means includes a valve movable within a valve chamber so as to connect said sealed chamber with either the atmosphere or with the intake manifold pressure of said engine, and a pressure-responsive member operatively connected to said valve and having one of its sides exposed to the atmosphere and its other side exposed to said intake manifold pressure whereby said sealed chamber will not be connected to said intake manifold pressure until the latter reaches a predetermined value.

9. Apparatus for controlling the admission of fuel and air to an internal combustion engine having a carburetor, an intake manifold and idling fuel passage means interconnecting said carburetor and said intake manifold, comprising: an air-fuel control member having a body formed with a fuel passage intersecting said passage means and in communication with said carburetor, said control member being formed with a distribution chamber, one side of which intersects said fuel passage and the other side of which intersects said passage means and is in communication with said intake manifold, said control member also being formed with fuel-air by-pass means which can conduct sufficient fuel and air to support normal idling of said engine, said control member likewise being formed with an air by-pass chamber, one side of the latter being separated from said distribution chamber by a choke restrictor lip and another side of the latter merging into an opening having communication with the atmosphere; a sealed chamber formed in said air-fuel control member; a fluid control post disposed within the body of said air-fuel control member and having a blocking plug, a fuel shut-off plug and an air by-pass plug; and a diaphragm operatively connected to said fluid control post so as to move it between a normal position wherein said blocking plug cooperates with said fuel passage to block flow therethrough during normal operation of said engine except through said fuel air by-pass means, a shut-off position wherein said fuel shut-off plug cooperates with said fuel passage to block all fluid flow therethrough while permitting communication between said distribution chamber and the atmosphere by means of said opening, a charging position wherein said blocking plug cooperates with said fuel passage to momentarily admit fuel and air into said distribution chamber in excess of that required for normal idling while a portion of said shut-off plug concurrently engages said choke restrictor lip so as to cut off flow between said distribution chamber and said opening, and an excess fuel-air position wherein said air by-pass plug cooperates with said air by-pass chamber to admit air into said distribution chamber in excess of that required for normal idling while said blocking plug cooperates with said fuel passage to admit fuel into said distribution in excess of that required for normal idling, said diaphragm being disposed within said sealed chamber with one of its sides constantly exposed to the atmosphere; and regulator means for alternately effecting communication between said sealed chamber and the atmosphere or between said sealed chamber and the intake manifold pressure of said engine.

10. Apparatus as set forth in claim 9 wherein said regulator means includes a valve movable within a valve chamber so as to connect said sealed chamber with either the atmosphere or with the intake manifold pressure of said engine, and a pressure-responsive member operatively connected to said valve and having one of its sides exposed to the atmosphere and the other to said intake manifold pressure whereby said sealed chamber will not be connected to said intake manifold pressure until the latter reaches a predetermined value.

11. Apparatus for controlling the admission of fuel and air to an internal combustion engine having a carburetor formed with a throat wherein is disposed a throttle valve, an intake manifold and passage means interconnecting said carburetor and said intake manifold, comprising: an air-fuel control member having a distribution chamber forming a portion of said passage means; a fluid control member disposed in said distribution chamber for controlling the flow of fluid therethrough, said fluid control member shutting off the flow of fuel through said distribution chamber during deceleration of said engine; actuating means operatively connected to said fluid control member so as to effect its movement; regulator means for said actuating means including a pressure-responsive member operatively connected to said actuating means so as to control its movement, one side of said pressure-responsive member being constantly exposed to the atmosphere; and conduit means connecting the other side of said pressure-responsive member with a first opening formed in said carburetor throat adjacent said throttle valve whereby said first opening will be directly exposed to the atmosphere only upon movement of said throttle valve from an idling position towards an open position, and a second opening more proximate to said intake manifold than said first opening.

12. Apparatus for controlling the admission of fuel and air to an internal combustion engine having a carburetor formed with a throat wherein is disposed a throttle valve, an intake manifold and passage means interconnecting said carburetor and said intake manifold, comprising: an air-fuel control member having a distribution chamber forming a portion of said passage means; a fluid control member disposed in said distribution chamber for controlling the flow of fluid therethrough, said fluid control member shutting off the flow of fuel through said distribution chamber during deceleration of said engine; actuating means having a pressure-responsive wall operatively connected to said fluid control member with one side of said wall being constantly exposed to atmospheric pressure and the opposite side being disposed in a sealed chamber; regulator means having a valve movable within a valve chamber so as to connect said sealed chamber with the atmosphere or alternately with the intake manifold pressure of said engine, said regulator means also including a pressure-responsive member for operating said valve, one side of said pressure-responsive member being constantly exposed to the atmosphere; and conduit means connecting the other side of said pressure-responsive member with a first opening formed in said carburetor throat adjacent said throttle valve whereby said first opening will be directly exposed to the atmosphere only upon movement of said throttle valve from an idling position towards an open position, and a second opening more proximate to said intake manifold than said first opening.

13. Apparatus for controlling the admission of fuel and air to an internal combustion engine having a carburetor formed with a pair of throats an an intake manifold, comprising: an air-fuel control member having a boss; a fuel distribution chamber formed in said control member and communicating with an arcuate discharge passage formed in said boss; conduit means connecting said chamber with said carburetor; a support for said air-fuel control member formed with a cavity for receiving said boss with said cavity aligned with said arcuate discharge passage, said support also being formed with a pair of fuel conducting passages extending away from spaced points in said cavity, each of said fuel conducting passages being in communication with one of the throats of said carburetor; and mounting means securing said air-fuel control member to said support, said mounting means permitting said boss to be rotatably adjusted relative to said cavity.

14. Apparatus for controlling the admission of fuel and air to an internal combustion engine having a carburetor formed with a pair of throats, and an intake manifold, comprising: an air-fuel control member having a cylindrical boss; a fuel distribution chamber formed in said control member and communicating with an arcuate discharge passage formed in said boss; conduit means connected to said carburetor; fuel-air by-pass means which can conduct sufficient fuel and air to support normal idling connecting said conduit means and said chamber; an idle adjusting screw cooperating with said air-fuel by-pass means to control the amount of fluid flow therethrough; a support for said air-fuel control member formed with a cylindrical cavity for rotatably receiving said boss with said cavity aligned with said arcuate discharge passage, said support also being formed with a pair of fuel conducting passages extending away from spaced points in said cavity, each of said fuel conducting passages being in communication with one of the throats of said carburetor; and mounting means securing said air-fuel control member to said support, said mounting means permitting said boss to be rotatably adjusted relative to said cavity.

15. Apparatus for controlling the admission of fuel and air to an internal combustion engine having a carburetor formed with a pair of throats and an intake manifold, comprising: an air-fuel control member having a body formed with a fuel passage in communication with said carburetor, said control member also being formed with fuel-air by-pass means which can conduct sufficient fuel and air to support normal idling of said engine; a boss on said air-fuel control member wherein is formed an arcuate discharge passage communicating with said fuel passage and with said fuel-air by-pass means; a fluid control member disposed within the body of said air-fuel control member and having a blocking plug and a fuel shut-off plug; actuating means operatively connected to said fluid control member so as to move it between a normal position wherein said blocking plug cooperates with said fuel passage to block fluid flow therethrough during normal operation of said engine except through said fuel-air by-pass means; an idle adjusting screw cooperating with said air-fuel by-pass means so as to control the amount of fluid flow therethrough; a support for said air-fuel control member formed with a cavity for receiving said boss with said cavity aligned with said arcuate discharge passage, said support also being formed with a pair of fuel conducting passages extending away from spaced points in said cavity, each of said fuel conducting passages being in communication with one of the throats of said carburetor; and mounting means securing said air-fuel control member to said support, said mounting means permitting said boss to be rotatably adjusted relative to said body.

References Cited in the file of this patent

UNITED STATES PATENTS

| 2,269,496 | Vanderpoel et al. | Jan. 13, 1942 |
| 2,386,340 | Olson | Oct. 9, 1945 |
| 2,466,090 | Fageol | Apr. 5, 1949 |